United States Patent
Antony et al.

(10) Patent No.: US 9,584,883 B2
(45) Date of Patent: Feb. 28, 2017

(54) PLACING A FIBRE CHANNEL SWITCH INTO A MAINTENANCE MODE IN A VIRTUALIZED COMPUTING ENVIRONMENT VIA PATH CHANGE

(71) Applicant: VMWARE, INC., Palo Alto, CA (US)

(72) Inventors: Jinto Antony, Bangalore (IN); Sudhish Panamthanath Thankappan, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 41 days.

(21) Appl. No.: 14/150,778

(22) Filed: Jan. 9, 2014

(65) Prior Publication Data

US 2015/0147057 A1 May 28, 2015

(30) Foreign Application Priority Data

Nov. 27, 2013 (IN) .......................... 5468/CHE/2013

(51) Int. Cl.
| | |
|---|---|
| *G01R 31/08* | (2006.01) |
| *H04J 1/16* | (2006.01) |
| *H04L 1/00* | (2006.01) |
| *H04Q 11/00* | (2006.01) |
| *H04L 29/08* | (2006.01) |

(52) U.S. Cl.
CPC ......... *H04Q 11/0005* (2013.01); *H04L 67/00* (2013.01); *H04Q 11/0001* (2013.01)

(58) Field of Classification Search
CPC .................................................. G06F 13/4022
See application file for complete search history.

(56) References Cited

U.S. PATENT DOCUMENTS

| | | | |
|---|---|---|---|
| 7,565,568 B1 * | 7/2009 | Kumar .................. | G06F 11/201 714/11 |
| 7,636,801 B1 * | 12/2009 | Kekre ................. | H04L 67/1097 709/218 |
| 7,774,391 B1 | 8/2010 | Le et al. | |
| 8,667,490 B1 | 3/2014 | van der Goot | |
| 8,909,980 B1 * | 12/2014 | Lewis ..................... | G06F 11/00 714/4.11 |
| 2006/0034181 A1 * | 2/2006 | Noguchi .................. | H04L 1/22 370/242 |
| 2007/0165520 A1 * | 7/2007 | Messing ................. | H04L 69/40 370/228 |
| 2009/0089781 A1 | 4/2009 | Shingai et al. | |
| 2009/0259816 A1 | 10/2009 | Sharma et al. | |
| 2010/0161922 A1 | 6/2010 | Sharp et al. | |
| 2010/0293316 A1 * | 11/2010 | Mehrotra ............ | H04L 67/1097 710/316 |
| 2011/0321041 A1 | 12/2011 | Bhat et al. | |
| 2013/0198562 A1 * | 8/2013 | Anthonisamy et al. ..... | 714/6.21 |
| 2013/0268800 A1 | 10/2013 | Rangaiah | |
| 2014/0075083 A1 * | 3/2014 | Engebretsen et al. ........ | 710/316 |

* cited by examiner

Primary Examiner — Maharishi Khirodhar

(57) ABSTRACT

Techniques for placing a first fiber channel (FC) switch into maintenance mode in a virtualized computing environment in which each data store is connected to at least one host computing system via at least two FC switches are described. In one embodiment, a first active input/output (I/O) path from a data store to a host computing system via the first FC switch is identified. Further, a path change is initiated from the data store to the host computing system via any other FC switch coupled to the data store and the host computing system.

18 Claims, 4 Drawing Sheets

PLACING A FIBRE CHANNEL SWITCH INTO A MAINTENANCE MODE IN A VIRTUALIZED COMPUTING ENVIRONMENT VIA PATH CHANGE

RELATED APPLICATIONS

Benefit is claimed under 35 U.S.C. 119(a)-(d) to Foreign application Serial No. 5468/CHE/2013 filed in India entitled "PLACING A FIBRE CHANNEL SWITCH INTO A MAINTENANCE MODE IN A VIRTUALIZED COMPUTING ENVIRONMENT VIA PATH CHANGE", filed on Nov. 27, 2013, by VMware, Inc., which is herein incorporated in its entirety by reference for all purposes.

TECHNICAL FIELD

The present disclosure relates to methods, techniques, and systems for storage network resource management in a virtualized computing environment and, more particularly, to methods, techniques, and systems for placing a fibre channel switch into a maintenance mode for service/repair, replacement, hardware upgrade and/or software upgrade.

BACKGROUND

Computer virtualization is a technique that involves encapsulating a representation of a physical computing machine platform into a virtual machine (VM) that is executed under the control of virtualization software running on hardware computing platforms (also referred to herein as "hosts" or "host computing systems"). A group of hardware computing platforms may be organized as a cluster to provide hardware resources for VMs. VMs may use virtual machine disks (VMDKs) to store its operating system, program files, and other data associated with its activities. The VMDKs that the VMs can access may reside on a data store connected to host computing systems via fibre channel (FC) switches. In a data center, it is common to see multiple FC switches and multiple VMs running on multiple clusters of hosts with each host connected to at least one data store via the multiple FC Switches.

SUMMARY

Various embodiments of systems and methods to place a first fibre channel (FC) switch into maintenance mode in a virtualized computing environment are described. For example, the first FC switch is placed into the maintenance mode for replacement, hardware upgrade, and/or software upgrade of the first FC switch. In one aspect, a first active input/output (I/O) path from a data store to a host computing system is the first FC switch is identified. Further, a path change is initiated from the data store to the host computing system via any other FC switch coupled to the data store and the host computing system, Furthermore, a check is made to determine whether there is any other active I/O path via the first FC switch. If there is any other active I/O path via the first FC switch, the steps of identifying, initiating and determining are repeated for a next active I/O path via the first FC switch. If there is no other active I/O path via the first FC switch, the first FC switch is placed into the maintenance mode.

In another aspect, a system includes FC switches, host computing systems, data stores, and a management server. The management server includes a switch maintenance module to perform the method described above.

In yet another aspect, a non-transitory computer-readable storage medium for placing a FC switch into a maintenance mode in a virtualized computing environment, having instructions that, when executed by a computing device causes the computing device to perform the method described above.

These and other benefits and features of embodiments of the invention will be apparent upon consideration of the following detailed description of preferred embodiments thereof, presented in connection with the following drawings.

DETAILED DESCRIPTION

Figure 1:
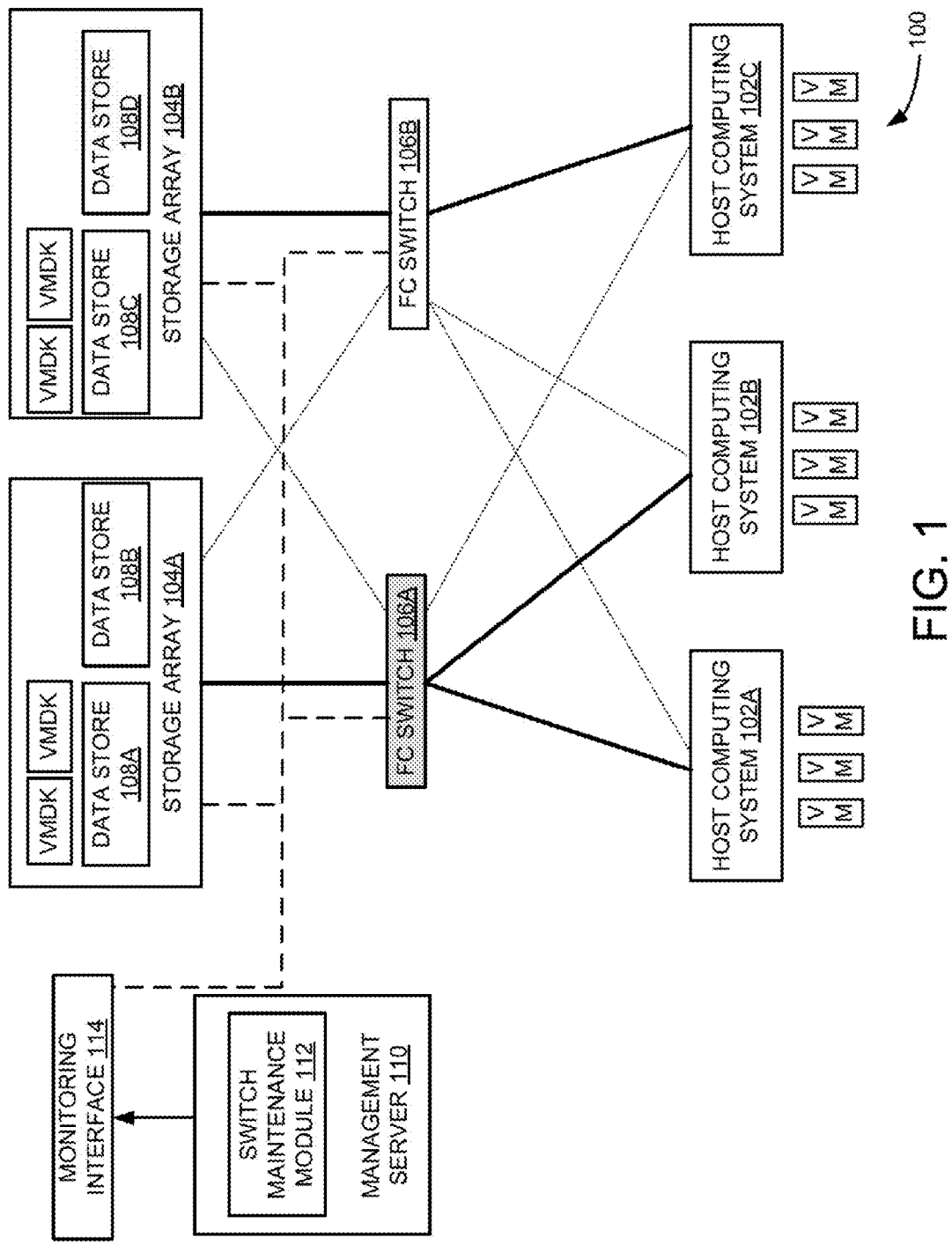
FIG. 1 depicts active input/output (I/O) paths identified between data stores and host computing systems via a fibre channel (FC) switch in a virtualized computing environment, according to an example embodiment.

Embodiments described herein provide enhanced computer-based and network-based methods, techniques, and systems for placing a fibre channel (FC) switch into a maintenance mode in a virtualized computing environment. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

The term "virtualized computing environment" is used herein to refer to a physical infrastructure that hosts a virtual infrastructure comprising virtual objects such as virtual machines (VWs), virtual data centers (VDCs), and virtual appliances (vApps). The term "FC switch" is used in the following description, however, in the present invention it is used broadly to refer to any storage network device such as Ethernet switches, fibre channel over Ethernet (FCoE) switches and so on. Further, the term "maintenance mode" refers to disabling or placing in standby active input/output (I/O) paths passing through an FC switch that needs to be taken out of service. For example, an FC switch needs to be placed into a maintenance mode for replacement, service/repair, hardware upgrade and/or software upgrade. The term active I/O path refers to a path that is carrying I/O traffic between a data store and a host computing system in the virtualized computing environment. Furthermore, the term "exiting maintenance mode" of an FC switch refers to enabling the I/O paths via the FC switch.

The present technique provides a switch maintenance module that identifies data stores having active I/O paths to host computing systems through an FC switch and disables or places into standby the active I/O paths by initiating a path change between the data stores and the host computing systems to route the I/O traffic through other FC switches based on a network topology map and I/O traffic at the other FC switches. The term "network topology map" refers to a map showing the relationships/connections between the FC switches, data stores and host computing systems in the virtualized computing environment. For example, the network topology map is used to determine the interconnections between the FC switches, data stores and the host computing systems.

In one example implementation, the switch maintenance module identifies a first active I/O path between a data store and a host computing system via a first FC switch and dynamically changes the first active I/O path through any other FC switch coupled to the data store and the host computing system. The switch maintenance module repeats this process for all active I/O paths that are using the first FC switch and then places the first FC switch into maintenance mode. In this case, a storage distributed resource scheduling framework can manage selection of FC switches based on the I/O traffic.

FIG. 1 depicts active I/O paths identified between data stores 108A and 108B and host computing systems 102A and 102B via FC switch 106A in virtualized computing environment 100, according to an example embodiment. In the example shown in FIG. 1, virtualized computing environment 100 includes host computing systems 102A-C, storage arrays 104A and 104B, management server 110, and monitoring interface 114. Each host computing system 102A-C has one or more virtual machines (VMs) running therein. Further, each storage array 104A and 104B includes respective data stores 108A-D. Furthermore, each data store 108A-D includes virtual machine disks (VMDKs) to store operating system, program files, and other data associated with VMs.

As shown in FIG. 1, host computing systems 102A-C are connected to storage arrays 104A and 104B via FC switches 106A and 106B. Each storage array 104A and 104B may include a storage controller to manage respective data stores 108A-D and presents them to host computing systems 102A-C as logical units. In the example shown in FIG. 1, virtualized computing environment 100 is described using two storage arrays 104A and 104B, three host computing systems 102A-C and two FC switches 106A and 106B, however, any number of storage arrays, host computing systems, and FC switches can be configured in virtualized computing environment 100.

Management server 110 includes switch maintenance module 112. For example, switch maintenance module 112 can be part of virtualization management software (VMS) residing in management server 110. One skilled in the art can appreciate that switch management module 112 can also be provided in a VM or virtual application that can run on any host computing system and can be provided to a user through a graphical user interface as a part of management software. In operation, switch maintenance module 112 obtains storage or I/O traffic and a network topology map associated with PC switches 106A and 106B using monitoring interface 114.

The network topology map here refers to a map showing the relationships between FC switches 106A and 106B, data stores 108A-D, host computing systems 102A-C, and VMs in virtualized computing environment 100. Monitoring interface 114 represents all interfaces, protocols, and other mechanisms for discovering network topology maps and monitoring network statistics, including I/O traffic at each port of an FC switch. Any existing proprietary and non-proprietary techniques can be used for monitoring storage networks, and it is intended that monitoring interface 114 serve as a generic representation of these techniques.

In the example shown in FIG. 1, switch maintenance module 112 initiates a maintenance mode operation of FC switch 106A. For example, FC switch 106A needs to be placed into the maintenance mode for replacement, hardware upgrade, service/repair and/or software upgrade. Further, switch maintenance module 112 identifies active I/O paths from data stores 108A-D to host computing systems 102A-C via FC switch 106A using the network topology map. In the example shown in FIG. 1, consider data store 108A as having active I/O paths to host computing systems 102A and 102B through FC switch 106A. Also, data store 108A is connected to host computing systems 102A and 102B through FC switch 106B. Therefore, switch maintenance module 112 initiates changing of the active I/O paths from data store 108A to host computing systems 102A and 102B through FC switch 106B as shown in FIG. 2.

Figure 2:
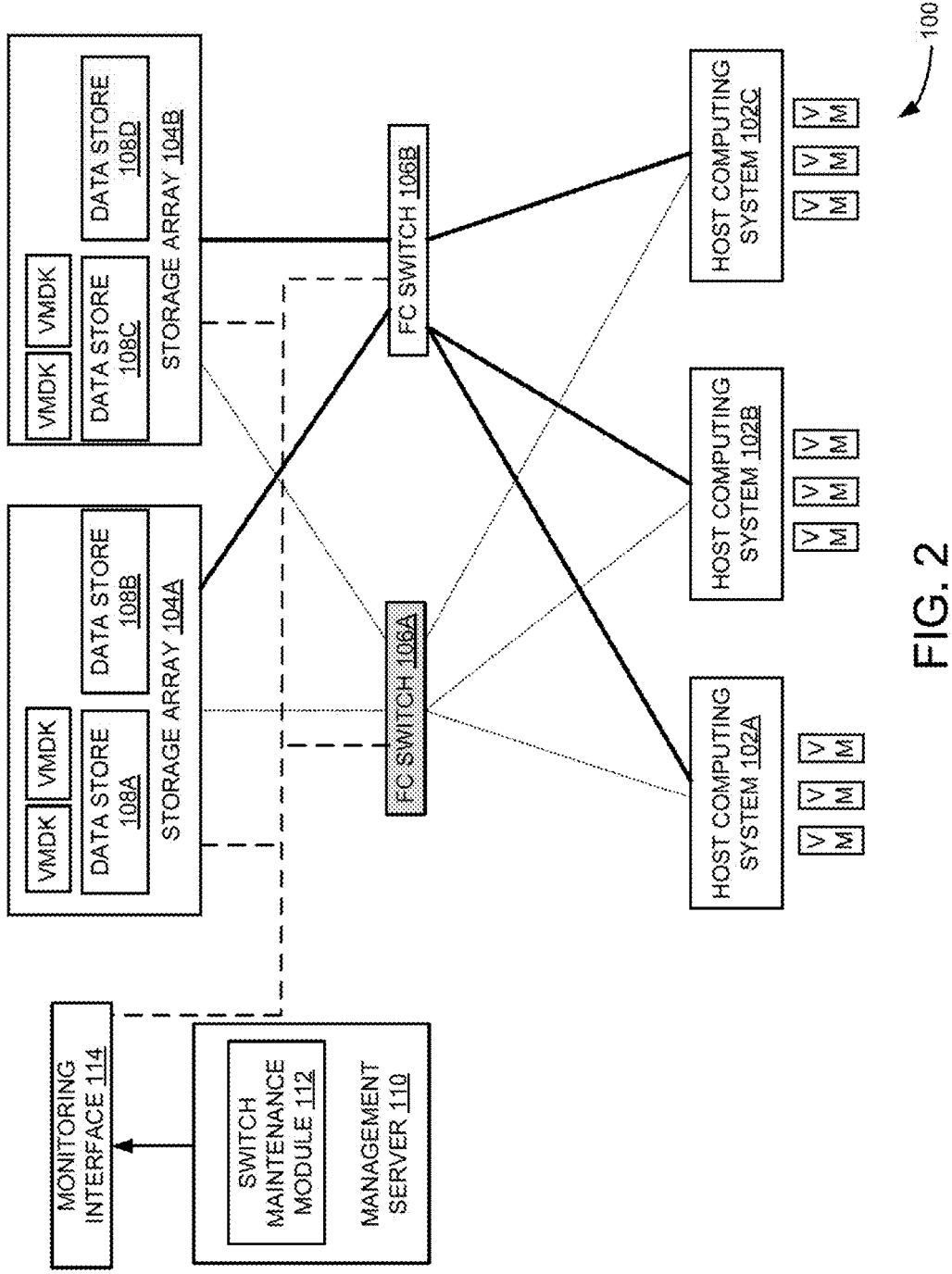
FIG. 2 illustrates placing the FC switch into a maintenance mode by initiating a path change from the data stores to the host computing systems via other FC switch, according to an example embodiment.

FIG. 2 illustrates placing FC switch 106A into the maintenance mode by changing the active I/O paths from data store 108A to host computing systems 102A and 102B through. FC switch 106B, according to an example embodiment. In this case, switch maintenance module 112 determines the I/O traffic at FC switches in virtualized computing environment 100 and then selects the underutilized FC switch (i.e., the FC switch having minimum I/O traffic) to route the I/O traffic between data store 108A and host computing systems 102A and 102B. Once all the active I/O paths are disabled or placed into standby, the switch maintenance module 112 recommends placing the FC switch 106A into maintenance mode.

Figure 3:
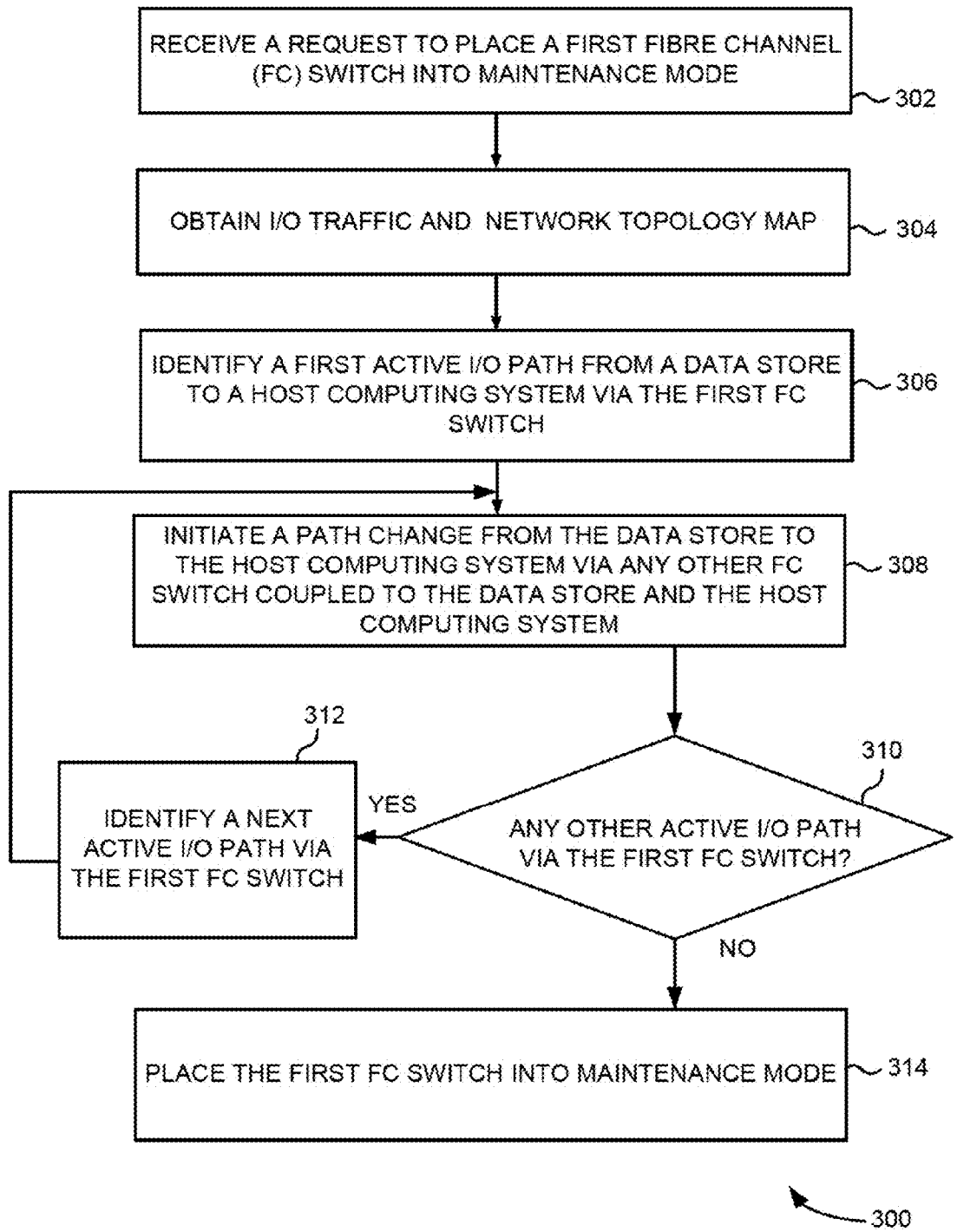
FIG. 3 is a flow chart of an example method for placing a first FC switch into a maintenance mode in a virtualized computing environment, according to an example embodiment.

FIG. 3 is a flow chart 300 of an example method for placing an FC switch into a maintenance mode in a virtualized computing environment, according to an example embodiment. In one example, the virtualized computing environment includes host computing systems, data stores and FC switches. Further, each host computing system has one or more workloads (e.g., VMs) running therein and each host computing system is coupled to a data store via at least two FC switches.

At step 302, a request to place a first FC switch into a maintenance mode is received. As discussed above, the term "maintenance mode" refers to disabling or placing in standby active I/O paths via the FC switch that needs to be taken out of service. At step 304, I/O traffic and a network topology map associated with the FC switches are obtained. In an example, the I/O traffic and the network topology map associated with the FC switches are obtained using a monitoring interface (e.g., interfaces, protocols, and other mechanisms for discovering network topology maps and monitoring network statistics) as described above in more detail with reference to FIG. 1.

At step 306, a first active I/O path from a data store to a host computing system via the first FC switch is identified. In this case, the host computing system executes a workload that access data from the data store via the first FC switch. At step 308, a path change from the data store to the host computing system is initiated via any other FC switch coupled to the data store and the host computing system (e.g., using the network topology map). In this case, the first active I/O path from the data store to the host computing system via the first FC switch is disabled or placed in standby mode. The storage resource scheduling framework manages selection of the other FC switch based on the I/O traffic. For example, if the data store and the host computing system are connected via a second FC switch and a third FC switch, then first active I/O path from the data store to the host computing system is changed through one of the second and third FC switches based on I/O traffic at the second and third FC switches. In other words, an underutilized FC switch the FC switch having minimum I/O traffic) between the second and third FC switches is selected to route the I/O traffic between the data store and the host computing system.

At step 310, a check is made to determine whether there is any other active I/O path between the data stores and the host computing systems via the first FC switch. At step 312, a next active I/O path is identified if there is any other active I/O path between the data stores and host computing systems via the first FC switch. Further, the steps of initiating and determining are repeated for the next active I/O path via the first FC switch. Once all the active I/O paths that are using the first FC switch are changed via other FC switches, the first FC switch can be placed into the maintenance mode at step 314.

Further, when the first FC switch is in exit maintenance mode, a path change is initiated from the data stores to the host computing systems via the first FC switch coupled to the data stores and the host computing systems. In other words, once the first FC switch is back to normal and functioning, the active I/O paths can be changed back to the first FC switch. Alternatively, the storage resource scheduling framework initiates a path change via the first FC switch to balance I/O traffic between the FC switches based on their utilization. The term "exit maintenance mode" refers to enabling the I/O path via the first FC switch and resuming of normal I/O traffic through the first FC switch. For example, the FC switch may be exited from the maintenance mode upon performing replacement, hardware upgrade, service/repair, and/or software upgrade of the FC switch.

In various embodiments, the systems and methods described in FIGS. 1 through 3 propose a technique to place a FC switch into the maintenance mode by initiating a path change from data stores to host computing systems via other FC switches coupled to the data stores and the host computing systems. Using this technique, the FC switch is placed into the maintenance mode without disconnecting any data stores or host computing systems or any other resources connected to the FC switch. Therefore, there is no downtime of the VMs running on the host computing systems.

Figure 4:
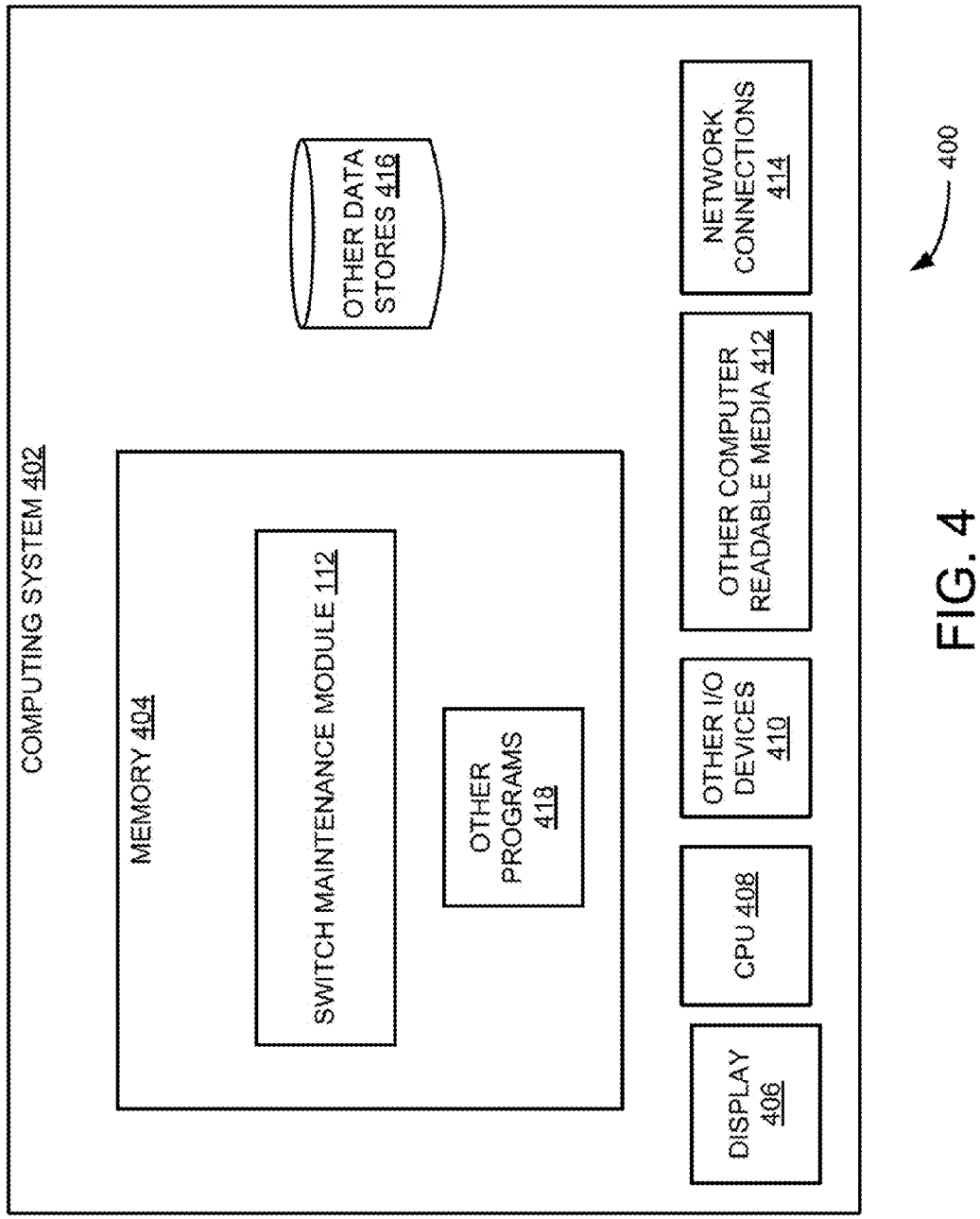
FIG. 4 is an example block diagram of a management server for implementing a switch maintenance module, such as the one shown in FIGS. 1 and 2.

FIG. 4 is block diagram 400 of an example physical computing system 402 (e.g., management server 110 shown in FIGS. 1 and 2) including switch maintenance module 112 according to an example embodiment. In particular, FIG. 4 shows computing system 402 that may be utilized to implement switch maintenance module 112. Note that one or more general purpose virtual or physical computer systems suitably instructed may be used to implement switch maintenance module 112. In addition, computing system 402 may comprise one or more distinct computing systems/devices and may span distributed locations.

In the embodiment shown, computing system 402 may comprise computer memory ("memory") 404, display 406, one or more Central Processing Units ("CPU") 408, input/output devices 410 (e.g., keyboard, mouse, etc.), other computer-readable media 412, and network connections 414. Switch maintenance module 112 is shown residing in memory 404. The components of switch maintenance module 112 may execute on one or more CPUs 408 and implement techniques described herein. Other code or programs 418 (e.g., an administrative interface, a Web server, and the like) may also reside in memory 404, and execute on one or more CPUs 408. Further, other data repositories, such as data store 416, may also reside in computing system 402. One or more of the components in FIG. 4 may not be present in any specific implementation. For example, some embodiments may not provide other computer readable media 412 or display 406.

Switch maintenance module 112 interacts via network with host computing systems in the cluster. The network may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication to and from remotely situated humans and/or devices.

In addition, programming interfaces to the data stored as part of switch maintenance module 112, such as in data store 416, can be available by standard mechanisms such as through C, C++, C#, and Java APIs; libraries for accessing files, databases, or other data repositories; through scripting languages such as XML; or through Web servers, FTP servers, or other types of servers providing access to stored data. Furthermore, in some embodiments, some or all of the components of switch maintenance module 112 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like.

Some or all of the system components and/for data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The invention claimed is:

1. An automated method of placing a first fibre channel (FC) switch into a maintenance mode in a virtualized computing, environment in which each data store is connected to at least one host computing system via at least two FC switches, comprising:

identifying a first active input/output (I/O) path from a data store to a host computing system of the at least one host computing system via the first FC switch in the virtualized computing environment by a processor, upon receiving a request to place the first FC switch into the maintenance mode wherein the host computing system executes at least one virtual machine that access data from the data store via the first FC switch;

initiating, by the processor, a path change from the data store to the host computing system via any other FC switch coupled to the data store and the host computing system;

determining whether there is any other active I/O path via the first FC switch by the processor; and placing the first FC switch into the maintenance mode by the processor based on an outcome of the determination.

2. The method of claim 1, wherein placing the first FC switch into the maintenance mode based on the outcome of the determination comprises:

when there is any other active I/O path via the first FC switch, repeating the steps of identifying, initiating and determining for a next active I/O path via the first FC switch; and when there is no other active I/O path via the first FC switch, placing the first FC switch into the maintenance mode.

3. The method of claim 1, wherein in initiating the path change from the data store to the host computing system via the other FC switch, the other FC switch is selected based on I/O traffic at the other FC switch.

4. The method of claim 3, wherein the other FC switch is selected using a storage resource scheduling framework.

5. The method of claim 1, further comprising exiting the maintenance mode of the first FC switch, comprising:

initiating a path change from the data store to the host computing system via the first FC switch coupled to the data store and the host computing system.

6. The method of claim 1, wherein the first FC switch is placed into the maintenance mode for at least one of replacement, hardware upgrade, and software upgrade of the first FC switch.

7. A system comprising:
a plurality of fibre channel (FC) switches;
a plurality of host computing systems;
a plurality of data stores, wherein each data store is coupled to at least one of the host computing systems via at least two FC switches; and
a management server comprising:
at least one processor;
memory coupled to the at least one processor, wherein the memory comprises a switch maintenance module to automatically place a first FC switch into a maintenance mode in a virtualized computing environment, by:
identifying an active input/output (I/O) path from a data store of the plurality of data stores to a host computing system of the plurality of host computing systems via the first FC switch in the virtualized computing environment, upon receiving a request to place the first FC switch into the maintenance mode, wherein the host computing system executes at least one virtual machine that access data from the data store via the first FC switch;

initiating a path change from the data store to the host computing system via any other FC switch coupled to the data store and the host computing system;

determining whether there is any other active I/O path via the first FC switch; and placing the first FC switch into the maintenance mode based on an outcome of the determination.

8. The system of claim 7, wherein the switch maintenance module is further configured to:

when there is any other active I/O path via the first FC switch, repeat the steps of identifying, initiating and determining for the next active I/O path via the first FC switch; and when there is no other active I/O path via the first FC switch, place the first FC switch into the maintenance mode.

9. The system of claim 7, herein the switch maintenance module selects the other FC switch based on I/O traffic at the other FC switch.

10. The system of claim 8, wherein the other FC switch is selected using a storage resource scheduling framework.

11. The system of claim 7, wherein the switch maintenance module exits the maintenance mode of the first FC switch by initiating a path change from the data store to the host computing system via the first FC switch coupled to the data store and the host computing system.

12. The system of claim 7, wherein the first FC switch is placed into the maintenance mode for at least one of replacement, hardware upgrade, and software upgrade of the first FC switch.

13. A non-transitory computer-readable storage medium having computer executable instructions stored thereon for placing a first fibre channel (FC) switch into a maintenance mode in a virtualized computing environment in which each data store is connected to at least one host computing system via at least two FC switches, the instructions are executable by a processor to:

identify a first active input/output (I/O) path from as data store to a host computing system of the at least one host computing system via the first FC switch in the virtualized computing environment, upon receiving a request to place the first FC switch into the maintenance mode, wherein the host computing system executes at least one virtual machine that access data from the data store via the first FC switch;

initiate a path change from the data store to the host computing system via any other FC switch coupled to the data store and the host computing system;

determine whether there is any other active I/O path via the first FC switch; and place the first FC switch into the maintenance mode used on an outcome of the determination.

14. The non-transitory computer-readable storage medium of claim 13, wherein placing, the first FC switch into the maintenance mode based on the outcome of the determination comprises:

when there is any other active I/O path via the first FC switch, repeating the steps of identifying, initiating and determining for a next active I/O path via the first FC switch; and when there is no other active I/O path via the first FC switch, placing the first FC switch into the maintenance mode.

15. The non-transitory computer-readable storage medium of claim 13, wherein in initiating the path change from the data store to the host computing system via the other FC switch, the other FC switch is selected based on I/O traffic at the other FC switch.

16. The non-transitory computer-readable storage medium of claim 15, wherein the other FC switch is selected using a storage resource scheduling framework.

17. The non-transitory computer-readable storage medium of claim 13, further comprising exiting the maintenance mode of the first FC switch, comprising:
   initiating a path change from the data store to the host computing system via the first FC switch coupled to the data store and the host computing system.

18. The non-transitory computer-readable storage medium of claim 13, wherein the first FC switch is placed into the maintenance mode for at least one of replacement, hardware upgrade, and software upgrade of the first FC switch.

* * * * *